US010185996B2

(12) United States Patent
Lee et al.

(10) Patent No.: US 10,185,996 B2
(45) Date of Patent: Jan. 22, 2019

(54) STOCK FLUCTUATION PREDICTION METHOD AND SERVER

(71) Applicant: FOUNDATION OF SOONGSIL UNIVERSITY INDUSTRY COOPERATION, Seoul (KR)

(72) Inventors: Soo Won Lee, Seoul (KR); Jang Yun Um, Seoul (KR)

(73) Assignee: FOUNDATION OF SOONGSIL UNIVERSITY INDUSTRY COOPERATION, Seoul (KR)

( * ) Notice: Subject to any disclaimer, the term of this patent is extended or adjusted under 35 U.S.C. 154(b) by 173 days.

(21) Appl. No.: 15/210,900

(22) Filed: Jul. 15, 2016

(65) Prior Publication Data

US 2017/0018033 A1    Jan. 19, 2017

(30) Foreign Application Priority Data

Jul. 15, 2015  (KR) .................. 10-2015-0100437
Dec. 23, 2015  (KR) .................. 10-2015-0184916

(51) Int. Cl.
   G06Q 40/06       (2012.01)
   G06N 7/00        (2006.01)

(52) U.S. Cl.
   CPC ............ G06Q 40/06 (2013.01); G06N 7/005 (2013.01)

(58) Field of Classification Search
   CPC ........ G06Q 10/00; G06Q 20/00; G06Q 30/00; G06Q 40/00
   USPC ...................................... 703/3-44; 705/3-44
   See application file for complete search history.

(56) References Cited

U.S. PATENT DOCUMENTS

| 8,285,619 | B2 * | 10/2012 | Herz ...................... G06Q 40/06 705/36 R |
| 8,346,646 | B2 * | 1/2013  | Cutler .................. G06F 3/0481 705/36 R |
| 8,374,903 | B2 * | 2/2013  | Little ................. G06Q 30/0202 705/7.31 |
| 8,380,654 | B2 * | 2/2013  | Stephens, Jr. ............ G06N 5/02 703/6 |
| 8,606,681 | B2 * | 12/2013 | O'Rourke .............. G06Q 40/06 705/36 R |

(Continued)

OTHER PUBLICATIONS

Moseki et al., "Analysing stock market data—Market sentiment approach and its measures", Financial Economics Review Article. (Year: 2017).*

*Primary Examiner* — Frantzy Poinvil
(74) *Attorney, Agent, or Firm* — Hauptman Ham, LLP

(57) ABSTRACT

Provided are a method and a system for predicting stock fluctuation prediction. A system for predicting stock fluctuation according to an embodiment of the present invention includes: a data collector and a preprocessor collecting news and KOSPI data and extracting words from the collected news through stopword removal and morphologic analysis, a sentiment dictionary constructor selecting sentiment words and calculating sentiment values of the sentiment words to construct a sentiment dictionary of a stock domain required for stock prediction, and a stock fluctuation prediction model constructor predicting fluctuation of a closing price of a next day to a closing price of a current day by combining a prediction model using the constructed sentiment dictionary and an ARIMA prediction model using the KOSPI data.

11 Claims, 10 Drawing Sheets

(56) References Cited

U.S. PATENT DOCUMENTS

| | | | | |
|---|---|---|---|---|
| 8,612,331 B2* | 12/2013 | Hanson | ............ | G06Q 30/0202 705/35 |
| 8,630,931 B2* | 1/2014 | Bendel | ................ | G06Q 40/06 705/35 |
| 8,856,056 B2* | 10/2014 | Di Sciullo | ............ | G06Q 40/06 706/45 |
| 8,930,254 B2* | 1/2015 | von Groll | ............ | G06Q 40/06 705/36 R |
| 2009/0024504 A1* | 1/2009 | Lerman | ................ | G06Q 40/00 705/35 |
| 2010/0179930 A1* | 7/2010 | Teller | ................ | G06N 99/005 706/12 |
| 2012/0226645 A1* | 9/2012 | O'Rourke | ............ | G06Q 40/06 706/46 |
| 2013/0030981 A1* | 1/2013 | Herz | .................. | G06Q 40/04 705/37 |
| 2013/0073480 A1* | 3/2013 | Sastri | .................. | G06Q 40/06 705/36 R |
| 2014/0149315 A1* | 5/2014 | Evenhouse | ............ | G06Q 40/06 705/36 R |
| 2016/0092989 A1* | 3/2016 | Marsh | ................ | G06Q 40/06 705/37 |

* cited by examiner

FIG. 2

| Index | Date | Current index | Comparison | Fluctuation rate | Binary | Current price index | High price index | Low price index |
|---|---|---|---|---|---|---|---|---|
| 1 | 2010-01-04 | 1696.14 | 13.37 | 0.79 | 1 | 1681.71 | 1696.14 | 1681.71 |
| 2 | 2010-01-05 | 1690.62 | -5.52 | -0.33 | 0 | 1701.62 | 1702.39 | 1686.45 |
| 3 | 2010-01-06 | 1705.32 | 14.7 | 0.87 | 1 | 1697.88 | 1706.89 | 1696.1 |
| 4 | 2010-01-07 | 1683.45 | -21.87 | -1.28 | 0 | 1702.92 | 1707.9 | 1683.45 |
| 5 | 2010-01-08 | 1695.26 | 11.81 | 0.7 | 1 | 1694.06 | 1695.26 | 1688.84 |
| 6 | 2010-01-11 | 1694.12 | -1.14 | -0.07 | 0 | 1700.79 | 1705.73 | 1694.12 |
| 7 | 2010-01-12 | 1698.64 | 4.52 | 0.27 | 1 | 1695.83 | 1701.16 | 1683.29 |
| 8 | 2010-01-13 | 1671.41 | -27.23 | -1.6 | 0 | 1683.51 | 1687.58 | 1671.11 |
| 9 | 2010-01-14 | 1685.77 | 14.36 | 0.86 | 1 | 1680.68 | 1692.79 | 1677.46 |
| 10 | 2010-01-15 | 1701.8 | 16.03 | 0.95 | 1 | 1684.65 | 1704.43 | 1680.12 |
| 11 | 2010-01-18 | 1711.78 | 9.98 | 0.59 | 1 | 1696.14 | 1716.62 | 1688.89 |
| 12 | 2010-01-19 | 1710.22 | -1.56 | -2.09 | 0 | 1719.41 | 1723.22 | 1706.73 |
| 13 | 2010-01-20 | 1714.38 | 4.16 | 0.24 | 1 | 1723.01 | 1723.01 | 1708.58 |
| 14 | 2010-01-21 | 1722.01 | 7.63 | 0.45 | 1 | 1700.53 | 1722.01 | 1695.18 |
| 15 | 2010-01-22 | 1684.35 | -37.33 | -2.19 | 0 | 1696.21 | 1706.09 | 1665.6 |
| 16 | 2010-01-25 | 1670.2 | -14.15 | -0.84 | 0 | 1682.77 | 1681.83 | 1660.58 |
| 17 | 2010-01-26 | 1637.34 | -32.86 | -1.97 | 0 | 1670.47 | 1671.66 | 1626.98 |

FIG. 7

```
> adf.test (train$value)

Augmented Dickey-Fuller Test data:   train$value
Dickey-Fuller = -3.2877, Lag order = 8, p-value = 0.07281
alternative hypothesis: stationary
```

FIG. 8

```
Series: train.stockRet
ARIMA (2, 0, 2) with zero mean

Coefficients:
          ar1        ar2       ma1       ma2
       -0.3271    -0.9179    0.3361    0.9884
s.e.    0.0399     0.0358    0.0197    0.0230 sigma^2 estimated as 0.7054:      log likelihood = -615.63
AIC = 1241.25    AICc = 1241.38    BIC = 1262.27
```

STOCK FLUCTUATION PREDICTION METHOD AND SERVER

CROSS-REFERENCE TO RELATED APPLICATIONS

This application is a National Phase Application of Korean Patent Application No. 10-2015-0100437, filed with the Korean Intellectual Property Office on Jul. 15, 2015, and Korean Patent Application No. 10-2015-0184916, filed with the Korean Intellectual Property Office on Dec. 23, 2015. The disclosures of the above patent applications are incorporated herein by reference in their entirety.

BACKGROUND

1. Technical Field

The present invention relates to a stock fluctuation prediction technology.

2. Description of the Related Art

In a stock market, asymmetry of information is present between stock experts and general investors.

The stock experts adopt a stock trade strategy by using high-level information or a trade technology, but personal investors adopt a stock trade strategy by using only basic information such as news or stock broadcasting.

Therefore, required is a method in which a stock price is predicted by using information for general persons to easily access, and as a result, general investors can also expect high profit rate.

SUMMARY

An aspect of the present invention may provide a method in which a stock price is predicted by using information for even general persons to easily access, and as a result, general investors can also expect high profit rate.

To achieve the objectives above, an embodiment of the present invention provides a server predicting stock fluctuation, including: a data collector collecting text data and securities stock index data; a preprocessor extracting words through stopword removal and morphological analysis of the collected text data; a sentiment dictionary constructor constructing a sentiment dictionary of a stock domain required for stock prediction by selecting a sentiment word from the extracted words and calculating a sentiment value of the selected sentiment word; and a stock fluctuation prediction model constructor predicting fluctuation of a closing price of a next day to a closing price of a current day by combining a prediction model using the constructed sentiment dictionary and an ARIMA prediction model using the collected securities stock index data.

To achieve the objectives above, another embodiment of the present invention provides a method for predicting stock fluctuation by a server, including: (a) collecting text data and securities stock index data; (b) extracting words through stopword removal and morphological analysis of the collected text data; (c) constructing a sentiment dictionary of a stock domain required for stock prediction by selecting a sentiment word from the extracted words and calculating a sentiment value of the selected sentiment word; and (d) predicting fluctuation of a closing price of a next day to a closing price of a current day by combining a prediction model using the constructed sentiment dictionary and an ARIMA prediction model using the collected securities stock index data.

According to an embodiment of the present invention, since stock price fluctuation is predicted by using news and past KOSPI data for general investors to easily access, it is practical.

Further, the embodiment can be used even to predict exchange rate closely related with a stock price and an economic index such as raw materials.

In addition, a sentiment dictionary of a stock price domain is automatically built up to be applied to other domains such as prediction of product sales using a product review based sentiment dictionary and prediction of movie promotion using a move review based sentiment dictionary.

Moreover, the embodiment of the present invention can be used as a decision making assistance means in financial institutions or governmental organizations and when the embodiment of the present invention extends to prediction of individual items in the future, the embodiment of the present invention can be used even in general enterprises.

An effect of the present invention is not limited to the above effect and it should be appreciated that the effect of the present invention includes all effects deduced from components of the present invention disclosed in the detailed description and the claims of the present invention.

Additional aspects and advantages of the present invention will be set forth in part in the description which follows, and in part will be obvious from the description, or may be learned by practice of the invention.

BRIEF DESCRIPTION OF THE DRAWINGS

FIG. 2 is diagrams illustrating a collection result of each of news and KOSPI data according to an embodiment of the present invention.

FIG. 7 is a diagram illustrating an execution result of a unit root test of Dickey-Fuller with respect to KOSPI data according to an embodiment of the present invention.

FIG. 8 is a diagram illustrating a selection result of an optimum ARIMA model according to an embodiment of the present invention.

DESCRIPTION OF NUMERALS

Figure 1:
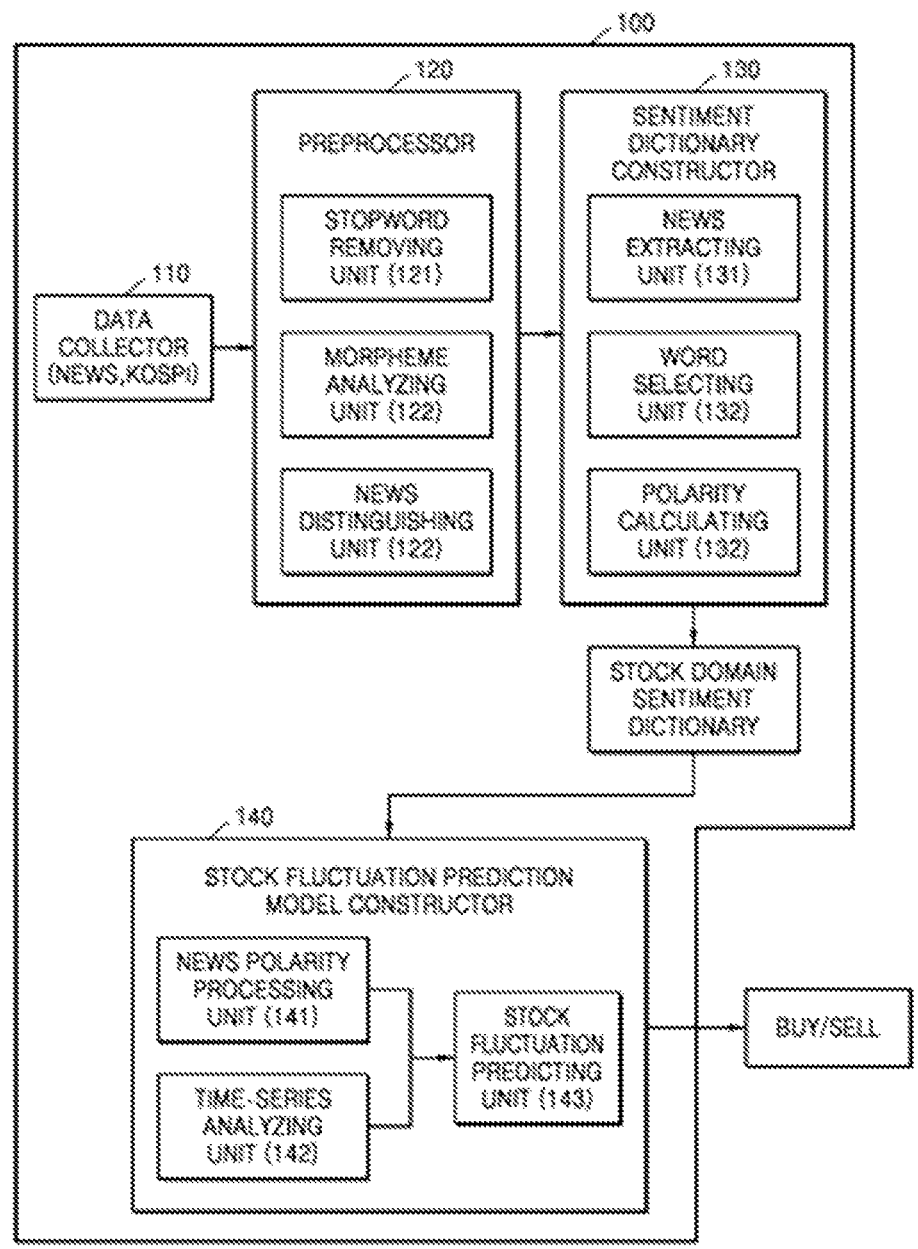
FIG. 1 is a diagram illustrating a configuration of a stock fluctuation prediction server according to an embodiment of the present invention.

100: Stock fluctuation predicting server
110: Data collector
120: Preprocessor 121: Stopword removing unit
122: Morpheme analyzing unit
123: News distinguishing unit
130: Sentiment dictionary constructor
131: News extracting unit
132: Sentiment word selecting unit
133: Polarity calculating unit
140: Stock fluctuation prediction model constructor
141: News polarity processing unit
142: Time-series analyzing unit
143: Stock fluctuation predicting unit

DETAILED DESCRIPTION

Hereinafter, the present invention will be described with reference to the accompanying drawings. As those skilled in the art would realize, the described embodiments may be modified in various different ways, all without departing from the spirit or scope of the present invention.

In addition, the drawings and description are to be regarded as illustrative in nature and not restrictive. Like reference numerals designate like elements throughout the specification.

Throughout this specification and the claims that follow, when it is described that a part is "coupled" to another part, the part may be "directly coupled" to the other part or "indirectly coupled" to the other part through a third part.

Further, unless explicitly described to the contrary, the word "comprise" and variations such as "comprises" or "comprising", will be understood to imply the inclusion of stated elements but not the exclusion of any other elements.

Hereinafter, embodiments of the present invention will be described in detail with reference to the accompanying drawings.

FIG. 1 is a diagram illustrating a configuration of a stock fluctuation prediction server according to an embodiment of the present invention.

The stack fluctuation prediction server 100 according to the embodiment of the present invention may include a data collector 110, a preprocessor 120, a sentiment dictionary constructor 130, and a stock fluctuation prediction model constructor 140.

When each component is briefly described, the data collector 110 may collect text data and a securities stock price index and the preprocessor 120 may extract a word through stopword removal and morphological analysis of the text data collected in the data collector 110.

Herein, the text data may include social data including news, SNS, blog, cafe bulletin board, and the like and hereinafter, as an embodiment of the text data, 'news' is used and as an embodiment of the securities stock price index, Korea composite Stock Price Index (KOSPI) is used.

Of course, the securities stock price index may not also be limited to the KOSPI and the securities stock price index for each country may be applied.

Meanwhile, the sentiment dictionary constructor 130 selects sentiment words from the words extracted by the preprocessor 120 and calculates sentiment values of the sentiment words to build up a sentiment dictionary of a securities domain required for predicting a stock price.

Meanwhile, the stock fluctuation prediction model constructor 140 combines a prediction model using the sentiment dictionary built up by the sentiment dictionary constructor 130 and an ARIMA prediction model using KOSPI data to predict a next-day closing price to a day closing price.

Hereinafter, the respective components will be described in detail.

First, the data collector 110 may collect the news as the text data and collect the KOSPI data as the securities stock price index as described above.

Meanwhile, the preprocessor 120 may perform a basic operation for extracting the sentiment words from the data collected by the data collector 110 and include a stopword removing unit 121, a morpheme analyzing unit 122, and a news distinguishing unit 123.

First, the stopword removing unit 121 may serve to purify the data collected by the data collector 110 so as to correctly analyze the collected data.

Economic news that delivers associated with securities may include multiple words including unnecessary advertisement phrases and figures, and item codes, and as a result, the morpheme analyzing unit 122 may not correctly and efficiently operate.

Therefore, the stopword removing unit 121 may purify the data so that the morpheme analyzing unit 122 correctly and efficiently operates.

[Table 1] given below shows an example of a stopword processing item and the stopword by the stopword removing unit 121.

TABLE 1

Stopword processing example

| Stopword processing item | Stopword example |
|---|---|
| Removing word having one syllable | That, he, besides, and the like |
| Deleting meaningless word such as figure or year | 2013 |
| Deleting item name and item code | Samsung Electronics, Hyundai Motors, Hynix |
| Deleting special character and advertisement copy | Hot magazine of today |

The morpheme analyzing unit 122 may mechanically analyze a morphologic structure of the word when a specific sentence is given and the morpheme analyzing unit 122 may extract a noun and a predicate from the data collected by the data collector 110, that is, a sentence of the news.

The news distinguishing unit 123 configures data required for building up the sentiment dictionary to process a case in which the configured data is not news distributed at an opening day (the weekend and a holiday) and extract continuous session news.

For reference, the continuous session news is news distributed for opening duration (09:00 to 15:00).

Meanwhile, the sentiment dictionary constructor 130 may perform the operation of building the sentiment of the securities domain required for the predicting stock price and include a new extracting unit 131, a sentiment word selecting unit 132, and a polarity calculating unit 133.

First, the news extracting unit 131 may extract only continuous session news in which fluctuation rate is a predetermined threshold or more.

Herein, the 'fluctuation rate' as stock fluctuation rate of a next day when specific continuous session news is distributed is obtained by reflecting an influence which the corresponding continuous session news exerts on stock fluctuation.

The sentiment word selecting unit 132 extracts words of specific word classes (the noun and the predicate) among the words extracted by the morphological analysis unit 122 and calculates emergency frequencies of the extracted words to extract sentiment words in which the emergency frequencies are a predetermined threshold or more.

The polarity calculating unit 133 calculates polarities of the sentiment words extracted by the sentiment word selecting unit 132 to build up the sentiment dictionary.

[Equation 1] given below is an equation for the polarity calculating unit 133 to calculate the polarities of the sentiment words.

$$\text{Ratio}_t = \frac{KOSPI(t) - KOSPI(t-1)}{KOSPI(t-1)} * 100$$

$$\text{Score}_{word}(w_i) = \frac{\sum_t (TF_{wi,t} * \text{Ratio}_t)}{\sum_t TF_{wi,t}}$$

[Equation 1]

$TF_{\omega_i,t}$ is Emergency frequency of word $\omega_i$ in continuous session news generated at date t (duplication is permitted)

Herein, $TF_{\omega_i,t}$ represents an emergency frequency permitting the word wi to be duplicated in the continuous session news generated at date t.

Ratiot represents a variable meaning fluctuation rate of the day closing price to the KOSPI closing price of the previous day of the specific date t.

Scoreword($\omega_i$) is an equation to calculating the sentiment of the word wi by aggregation averaging the emergency frequency of wi to a fluctuation rate weight Ratiot at a date t when the word emerges.

Further, Scoreword($\omega_i$) has a range of $-\infty$ to $\infty$ and means a stronger rise as Scoreword($\omega_i$) comes closer to $\infty$.

An example of estimating the sentiment value of the sentiment word is shown in [Table 2].

TABLE 2

Example of estimating polarity value for sentiment word 'short selling'

| Index | News time | Fluctuation rate of closing price of current day to closing price of previous day | Text | $TF_{\omega_i,t}$ | Ratio$_t$ |
|---|---|---|---|---|---|
| 1 | 2013 Dec. 2 14:28 | −1.05 | It is analyzed that funds targeting a year-end dividend yield are brought in and debit repayment which repays the short selling will help the supply and demand. | 1 | −1.05 |
| 2 | 2013 Nov. 27 15:25 | 0.84 | It is because expected is an effect of short covering repurchase for items on which the short selling has concentrated in the meantime while it is anticipated that a loan transaction balance will be reduced. | — | — |
| 3 | 2013 Jul. 16 09:28 | 1.13 | Loan transaction has continuously continued in a domestic stock market. | — | — |
| 4 | 2013 Jul. 3 14:04 | 0.79 | Investors get tensed up due to high riding of a loan balance because the high riding of the loan balance may cause the short selling. However, an influence which the short selling exerts on the stock market is limited. | 2 | 0.79 |
| 5 | 2011 Nov. 9 09:10 | 2.77 | 12% is reduced as compared with before a short selling preventing action. | 2 | 2.77 |
| 6 | 2011 Nov. 9 10:39 | 2.77 | It is because the short selling prevention limitatively influences the stock market. | | |

$$\sum_t TF_{shortselling,t} = 5$$

$$\text{Score}_{word}(\text{short selling}) = \frac{-1.05 + (2*0.79) + (2*2.27)}{5} = 1.014$$

In [Table 2], a word 'short selling' is generated in five news (indexes #1, #2, #4, #5, and #6) among six news.

However, since the news of index #2 is news generated out of the opening duration (09:00 to 15:00), the news of index #2 is excluded.

In the case of the news of index #4 which is a case where the word is generated several times, since the word 'short selling' emerges twice, TFwi,t becomes 2 and in the case of indexes #5 and #6 which is a case where the word generated in the continuous session is generated several times, since the word 'short selling' is generated twice, TFwi,t becomes 2.

Since Scoreword (short selling) is calculated by such a method, the Scoreword becomes 1.041 which is an average value of TFwi,t*Ratio$_t$.

[Table 3] shows a part of the sentiment dictionary generated through the equation that calculates the polarity value of the sentiment dictionary constructor 130.

TABLE 3

Example of generated sentiment dictionary

| Sentiment word | Word attribute | Score$_{word(\omega_t)}$ | $\sum_t TF_{w_0 t}$ | TF$_{w_0 t}$*Ratio$_t$ |
|---|---|---|---|---|
| Short selling | Noun | 0.542 | 285 | 154.58 |
| Stock price falling | Noun | 0.414 | 120 | 49.68 |
| Interest rate reduction | Noun | 0.372 | 183 | 68.05 |
| Strategic | Noun | 0.361 | 135 | 59.55 |
| Disparate ratio | Noun | 0.295 | 123 | 36.31 |
| Imbalance | Noun | 0.242 | 171 | 41.38 |
| Weak yen | Noun | 0.236 | 221 | 52.07 |
| Warm breeze | Noun | 0.226 | 176 | 39.72 |
| Falling range excess stock | Noun | 0.221 | 115 | 25.36 |
| Limited | Predicate | 0.212 | 208 | 44.13 |
| Configured | Predicate | 0.203 | 246 | 49.85 |
| Upward adjustment | Noun | 0.173 | 121 | 20.91 |
| Composite leading index | Noun | 0.17 | 554 | 93.91 |
| Obtain | Predicate | 0.162 | 155 | 25.51 |
| Possess | Predicate | 0.16 | 405 | 64.65 |

Meanwhile, stock fluctuation prediction model constructor 140 may generate a mode for predicting the stock fluctuation and include a new polarity processing unit 141, a time series analysis unit 142, and a stock fluctuation predicting unit 143.

First, the new polarity processing unit 141 may calculate the sentiment value for the continuous session news at a specific date and calculate the sentiment value for the specific date.

To this end, the new polarity processing unit 141 may calculate the sentiment value for specific news based on a polarity average of sentiment words which emerge in specific continuous session news by using [Equation 2].

Sentiment value for specific news $k$ [Equation 2]

$$SW(\text{Sentiment Word}) = \{w_1, \ldots, w_n\}$$

$$\text{News}_{t,k} = \{w_{t,k,1} \ldots, w_{t,k,n}\}$$

$$\text{Score}_{News}(\text{News}_{t,k}) = \frac{\sum_{w_i \in SW \cap News_{t,k}} \text{Score}_{word}(w_i)}{|SW \cap \text{News}_{t,k}|}$$

In [Equation 2], when a set of the sentiment words included in the sentiment dictionary is a sentiment word (SW) and a set of words extracted from k-th news among a plurality of news distributed at a specific date t is News$_{t,k}$, Scorenews(News$_{t,k}$) which is a sentiment value of specific news k may be calculated by an average of sentiment values of words which simultaneously emerge in News$_{t,k}$.

Further, the new polarity processing unit 141 may calculate the sensitivity value for the corresponding date based on the sensitivity of the continuous session news distributed at the specific date t by using [Equation 3].

Sensitivity value for specific date $t$ [Equation 3]

$$\text{Score}_{Day}(t) = \frac{\sum_k \text{Score}_{News}(\text{News}_{t,k})}{n_t}$$

The number of continuous session news generated at specific date t

That is, ScoreDay(t) which is the sentiment value for a day may be calculated by using an average of Scorenews (News$_{t,k}$).

[Table 4] shows an embodiment of a method in which the news polarity processing unit 141 calculates ScoreDay(t) which is the sentiment value for a day by using SW of the sentiment dictionary and [Table 5] shows an embodiment of the sentiment dictionary.

TABLE 4

ScoreDay(t) calculating method

| News time | Text | Score$_{News(News_{t,k})}$ |
|---|---|---|
| 2013 Dec. 2 14:28 | Stock holding sum of foreigners rather increases to 0.14331 billion won for Cayman Islands in this-year domestic stock net sale and the stock price falling is caused due to the short selling and the foreigners play an active part even in Europe including Spain, and the like and uneasiness is amplified due to short selling of government bonds, therefore, hedge funds have attracted public attention as a main culprit which increases stoke fluctuation in recent years. | Score$_{word(shortselling)}$ = 0.542 |

TABLE 4-continued

ScoreDay(t) calculating method

| News time | Text | Score$_{News(News_{t,k})}$ |
|---|---|---|
| | | $\|$Score$_{word(Stockpricefalling)}$ = 0.414 $\frac{0.542 + 0.414}{2} * 100 = 47.8$ |
| 2013 Dec. 2 11:45 | While inflow of stock funds is limited with expansion of uncertainty of an international financial market, won-dollar exchange rate shows a slightly high level, however, if U.S. Feral without exerting a large impact on the financial market, the uncertainty is released and reliabile fundamental economic circumferences such as continuation of a current account surplus, and the like stand out, and as a result, it is prospected that Korean currency appreciation pressure will gradually increase | Score$_{word(Limited)}$ = 0.212 Score$_{word(Interestratereduction)}$ = 0.372 $\frac{0.212 + 0.372}{2} * 100 = 29.2$ |
| 2013 Dec. 2 09:28 | It is anticiated that processing cooperation with ICT enterprises is constructed through aggressive purusing proactive partnership with the ICT enterprises, strategically joining in the existing settlement ecosystem, and thelike from the view point of diversification of sales channels. | Score$_{word(Strategic)}$ = 0.361 $\frac{0.361}{2} * 100 = 36.1$ |
| | Score$_{Day}$(2013 Dec. 02) = $\frac{47.8 + 29.2 + 36.1}{3} = 37.7$ | |

TABLE 5

Example of sentiment dictionary (SD)

| Sentiment word | Word attribute | Sentiment value |
|---|---|---|
| Short selling | Noun | 0.542 |
| Stock price falling | Noun | 0.414 |
| Interest rate reduction | Noun | 0.372 |
| Strategic | Noun | 0.361 |
| Falling range excess stock | Noun | 0.221 |
| Limited | Predicate | 0.212 |

In [Table 4], when the total number of news distributed in the continuous session on Dec. 2, 2013 is 3 and the sentiment value of the specific news is calculated by using the sentiment values of the sentiment words which are present in [Table 5] showing the sentiment dictionary, 'short selling' emerges once and 'stock price drop' emerges in news #1, and as a result, Scorenews(News$_{t,k}$) which is the value of the sentiment value has a value of 47.8.

By such a method, when the sentiment values of news #2 and news #3 are calculated, the sentiment values of news #2 and news #3 are calculated as 29.2 and 36.1, respectively.

Since ScoreDay(2013-12-02) represents an average of polarity values of the continuous session news generated for a day, 37.7 which is an average of 47.8, 29.2, and 36.1 as above may be calculated.

The time series analysis unit 142 of the stock fluctuation prediction model constructor 140 may inspect prediction power of the ARIMA model by using the KOSPI data, determine AR, MA, and Integeration through the prediction power inspection, and calculate ARIMApreds(t) which is a prediction probability value by using the determined ARIMA model.

To this end, the time series analysis unit 142 may calculate the prediction probability value by using [Equation 4].

For reference, [Equation 4] shows the ARIMA model in which AR is p, MA is q, and Integeration is 0.

$$Y_t = a_1 Y_{t-1} + a_2 Y_{t-2} + \ldots + a_p Y_{t-p} + u_t + \beta_1 u_{t-1} + \beta_2 u_{t-2} + \ldots + \beta_q u_{t-q}$$ [Equation 4] ARIMA(p,0,q) model The stock fluctuation predicting unit 143 may generate a stock fluctuation prediction model (logistic regression) by using ScoreDay(t) which is the sentiment value for the specific date calculated through [Equation 2] and [Equation 3] and ARIMApreds(t) which is the prediction probability value of the ARIMA model determined in [Equation 4] and predict rise and drop of the next-day closing price to the day closing price by using the generated stock fluctuation prediction model.

The stock fluctuation prediction model generated by the stock fluctuation predicting unit 143 may be shown in [Equation 5].

[Equation 5] as a stock fluctuation prediction model proposed in an embodiment of the present invention, x1 represents a result value of calculating the sentiment value for a day by using the sentiment dictionary extracted through the continuous session news and x2 represents a prediction probability value of the ARIMA model determined through the prediction power inspection of the ARIMA model.

$$\text{Stock fluctuation prediction model} \quad \text{[Equation 5]}$$
$$x_1 = \text{Score}_{Day}(t)$$
$$x_2 = ARIMA_{preds}(t)$$
$$\ln\left(\frac{p}{1-p}\right) = a + b_1 x_1 + b_2 x_2$$

For reference, the ARIMA model as a method contrived by Box and Jenkins is primarily used to perform future prediction.

The ARIMA model is constituted by an auto regressive (AR) part and a moving average (MA) part and includes an Integrated part capable of separately modeling a difference in variable value.

In the ARIMA model, the AR model as an abbreviation of an autoregressive model means a function therefor, in which Y at a previous time influences Y at a current time.

In order to generate the AR model, provided is a condition that whether a residual is white noise and time-series data is stationary needs to be reviewed.

Herein, the 'white noise' means the time-serial data independently (iid) obtained from the same distribution in which an average of the residual is 0 and a distribution is σ2 and the 'stationary' means that each average and distribution are constants regardless of the time and co-variance of a t time and a t–n time satisfies a predetermined condition regardless of t.

[Equation 6] shows AR(n) when the time t is n.

$$Y_t = a_1 Y_{t-1} + a_2 Y_{t-2} + \ldots + a_n Y_{t-n} + u_t \ (u_t\text{:iid white noise}) \quad \text{[Equation 6] AR(n) model}$$

Further, in the ARIMA model, the MA model as an abbreviation of Moving Average model means a function in which the Y at the previous time uses an error and a weighted value of Y at the current time.

The MA model need not verify a stationary condition like an AR process due to a characteristic of the model, but the MA model needs to satisfy an invertibility condition which is a similar condition.

[Equation 7] is a model of MA(n) which is an n-th degree of the MA model.

$$Y_t = a_1 u_{t-1} + a_2 u_{t-2} + \ldots + a_n u_{t-n} + u_t \ (u_t\text{:iid white noise}) \quad \text{[Equation 7] MA(n) model}$$

In the ARIMA model, an integrate is used for making stationary data and when an average of a series is not constant as the time elapses, the data needs to be normally made by taking the integrate.

In the case of data which stationarized through one integration, the integrate may be expressed as 1.

[Equation 8] shows an ARIMA(p,0,q) model.

$$Y_t = a_1 Y_{t-1} + a_2 Y_{t-2} + \ldots + a_p Y_{t-p} + u_t + \beta_1 u_{t-1} + \beta_2 u_{t-2} + \ldots + \beta_q u_{t-q} \quad \text{[Equation 8] ARIMA(p,0,q) model}$$

FIG. 2 is diagrams illustrating a collection result of each of news and KOSPI data according to an embodiment of the present invention.

In the embodiment of the present invention, from January 2010 up to December 2014, economic news (a total of 76300 cases) which is present in 'Naver>Securities>News>Primary news' tab and daily KOSPI data (a total of 1239 cases) which is present in 'Korea Stock Exchange (KRX)>domestic index>daily index' tab are collected.

Collection results for the news and the KOSPI data, respectively are illustrated in FIG. 2.

Figure 3:
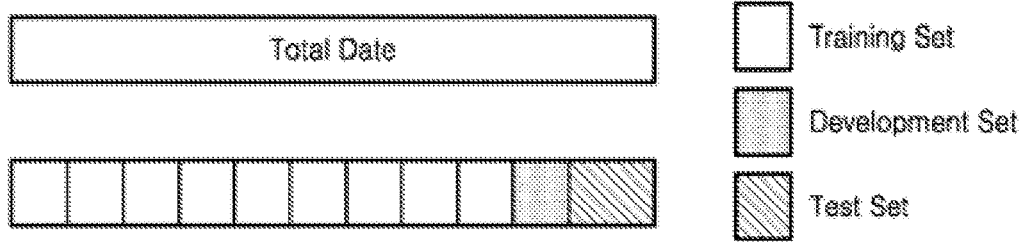
FIG. 3 is a diagram illustrating a method for configuring learning data and evaluation data for evaluating a stock fluctuation prediction model according to an embodiment of the present invention.

FIG. 3 is a diagram illustrating a method for configuring learning data and evaluation data for evaluating a stock fluctuation prediction model according to an embodiment of the present invention.

In order to evaluate the stock fluctuation prediction model (hereinafter, referred to as a 'prediction model') according to the embodiment of the present invention, collected data is divided into Training Set, Development Set, and Test Set.

Herein, the 'Training Set' is data used to learning stock fluctuation prediction model, the 'Development Set' is data predicted and inspected by performing a test for each parameter, and the 'Test Set' is data predicted by using a parameter which is best in the Development Set.

Further, [Table 6] given below shows learning data and evaluation data.

TABLE 6

Learning data and evaluation data

| Item | Period | The number of collected news cases | The number of continuous session news cases through preprocessing | The number of KOSPI days |
|---|---|---|---|---|
| Training Set | 2010.01~2013.07 | 51,638 cases | 23,504 cases | 892 days |
| Development Set | 2013.08~2013.12 | 3,937 cases | 1,323 cases | 102 days |
| Test set | 2014.01~2014.12 | 20,725 cases | 4,030 cases | 245 days |

As an evaluation criterion for the prediction model, accuracy is used and may be calculated as shown in [Equation 9].

$$\text{Accuracy formula} \quad \text{[Equation 9]}$$
$$\text{Accuracy} = \frac{TP + TN}{TP + TN + FP + FN}$$

In [Equation 9], the 'accuracy' may be defined as a ratio correctly predicted among results predicted by rising and falling in the prediction model.

Herein, true positive (TP) means that the prediction model classifies 'actual rising' into 'rising' and false positive (FP) means that the prediction model classifies 'actual falling' into 'rising'.

Further, false negative (FN) means that the prediction model classifies 'actual falling' into 'rising' and true negative (TN) means that the prediction model classifies 'actual falling' into 'falling'.

Meanwhile, in the embodiment of the present invention, an accuracy comparison test of stock fluctuation is performed by various methods.

The prediction accuracy is compared for each parameter and each word class used for generating the sentiment dictionary, the prediction accuracy is compared by using the sentiment dictionary which is manually/automatically/semi-automatically generated, and accuracy when the sentiment dictionary prediction model and the ARIMA prediction mode are mixed is compared and evaluated.

Figure 4:
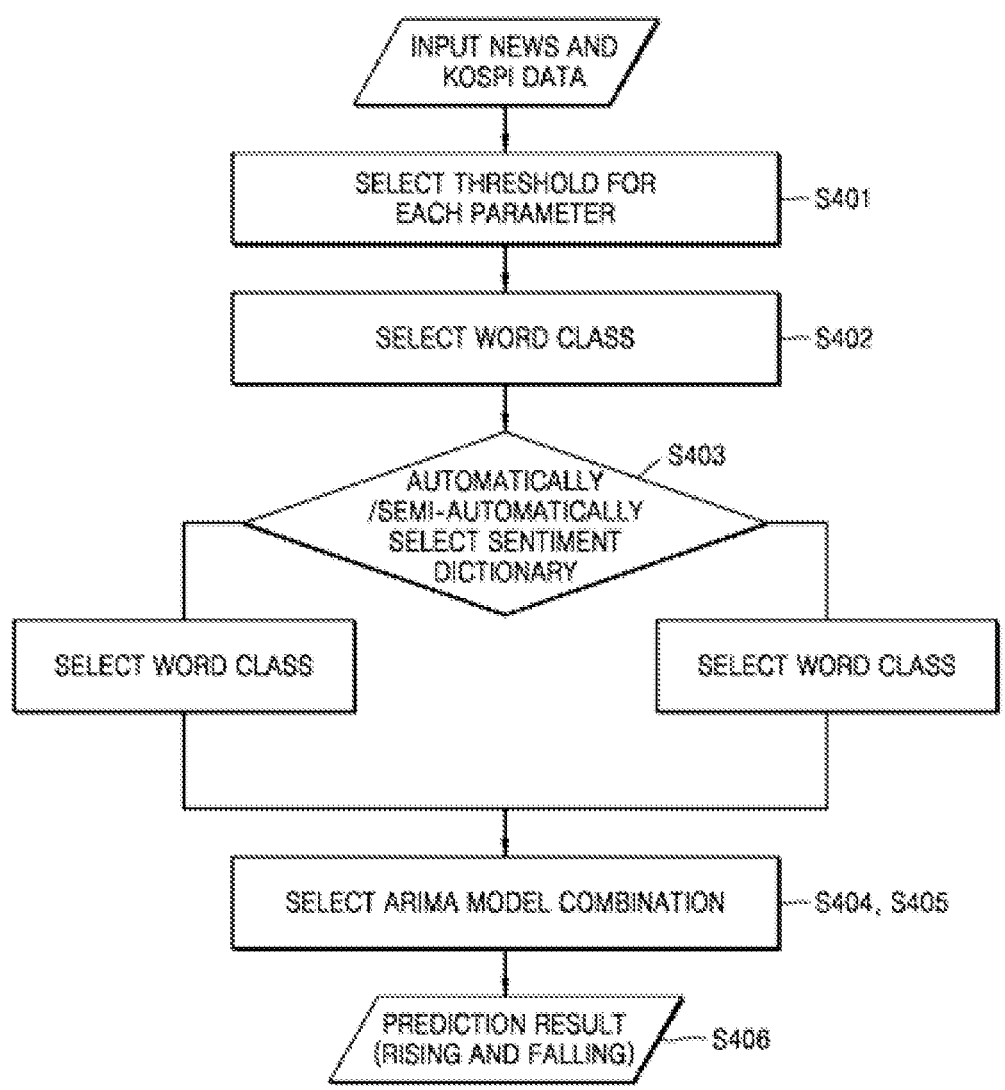
FIG. 4 is a flowchart illustrating a process of testing accuracy of a prediction model according to an embodiment of the present invention.

FIG. 4 is a flowchart illustrating a process of testing accuracy of a prediction model according to an embodiment of the present invention.

Hereinafter, the test process according to the embodiment of the present invention will be described based on the flowchart illustrated in FIG. 4 and each process will be described in detail with reference to FIGS. 5 to 9.

S401, in the prediction accuracy sentiment dictionary depending on the sentiment for each parameter threshold, the word, the sentiment value, and the prediction accuracy vary depending on the fluctuation rate threshold and the emergency frequency threshold.

In the embodiment of the present invention, the stock fluctuation prediction accuracy depending on the fluctuation rate threshold and the emergency frequency threshold is compared.

Figure 5:
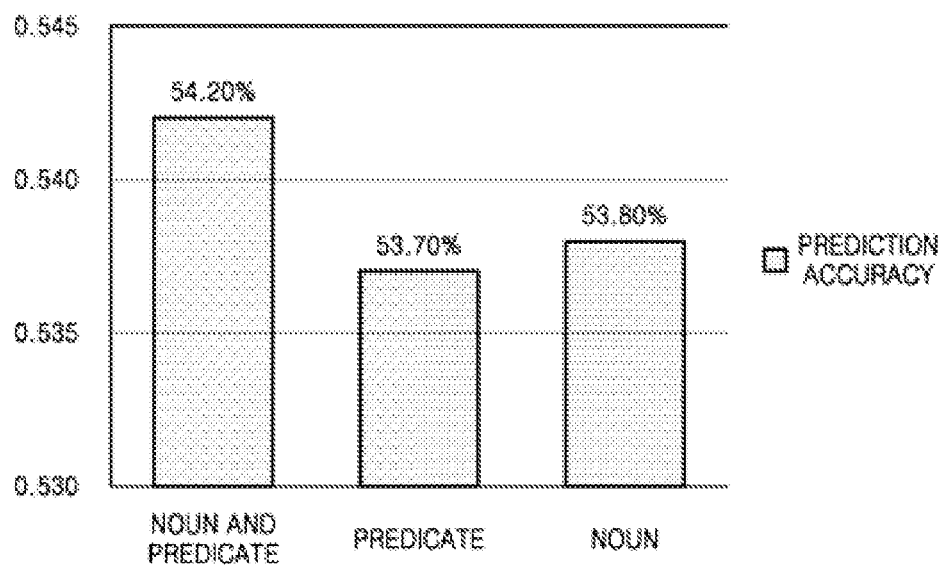
FIG. 5 is a diagram illustrating a result of prediction accuracy based on a sentiment dictionary for each word class according to an embodiment of the present invention.

FIG. 5 is a diagram illustrating a result of prediction accuracy based on a sentiment dictionary for each word class according to an embodiment of the present invention.

As illustrated in FIG. 5, the prediction model based on the sentiment dictionary using both the noun and the predicate shows highest accuracy as 54.2% and the prediction module based on the sentiment dictionary using the predicate shows lowest accuracy as 53.7%.

S403, Prediction Accuracy Depending on Manual/Automatic/Semi-Automatic Sentiment Dictionary Construction In the embodiment of the present invention, the prediction accuracy when the sentiment dictionary for each word class, which is generated by the result of S402 is constructed manually/automatically/semi-automatically is compared.

The manual sentiment dictionary is a method using the sentiment dictionary in which a researcher arbitrarily grants the sentiment value to words which seem to be meaningful as −1 (a negative word) and 1 (a positive word) and excludes words seem to be meaningless from the sentiment word ion the sentiment dictionary for each word class, which is automatically generated by the result of S402.

[Table 7] given below shows an example of the manual sentiment dictionary and 'approve' and 'consumption sentiment' are removed by the researcher.

TABLE 7

Example of manual sentiment dictionary

| Sentiment word | Word attribute | Sentiment value |
|---|---|---|
| Fall | Predicate | −1 |
| Approve | Predicate | — |
| Positive trend | Noun | 1 |
| Obtain | Predicate | 1 |
| Consumption sentiment | Noun | — |
| ... | ... | ... |

The semi-automatic sentiment dictionary is a method using in which the researcher arbitrarily maintains the sentiment value which is automatically generated with respect to the words which seem to be meaningful as it is and excludes the words which seem to be meaningless from the sentiment word in the sentiment dictionary automatically generated by the result of S402.

[Table 8] shows an example of the semi-automatic sentiment dictionary and 'Egypt' and 'resolve' are words excluded by the researcher.

TABLE 8

Example of semi-automatic sentiment dictionary

| Sentiment word | Word attribute | Sentiment value |
|---|---|---|
| Egypt | Noun | 0.207 |
| Resolve | Predicate | 0.145 |
| Uneasiness | Noun | −0.252 |
| Break away | Predicate | 0.223 |
| Earning shock | Noun | −0.031 |
| ... | ... | ... |

When the manual/semi-automatic/automatic sentiment dictionary is constructed by such a method, the numbers of sentiment words of the manual and semi-automatic sentiment dictionaries are the same as 235 and the number of sentiment words of the automatic sentiment dictionary is configured as 861.

[Table 9] shows the number of sentiment words of manual/semi-automatic/automatic sentiment dictionary

TABLE 9

Number of sentiment words of manual/semi-automatic/automatic sentiment dictionary

| | The number of sentiment words |
|---|---|
| Manual sentiment dictionary | 235 words |
| Semi-automatic sentiment dictionary | 235 words |
| Automatic sentiment dictionary | 861 words |

Figure 6:
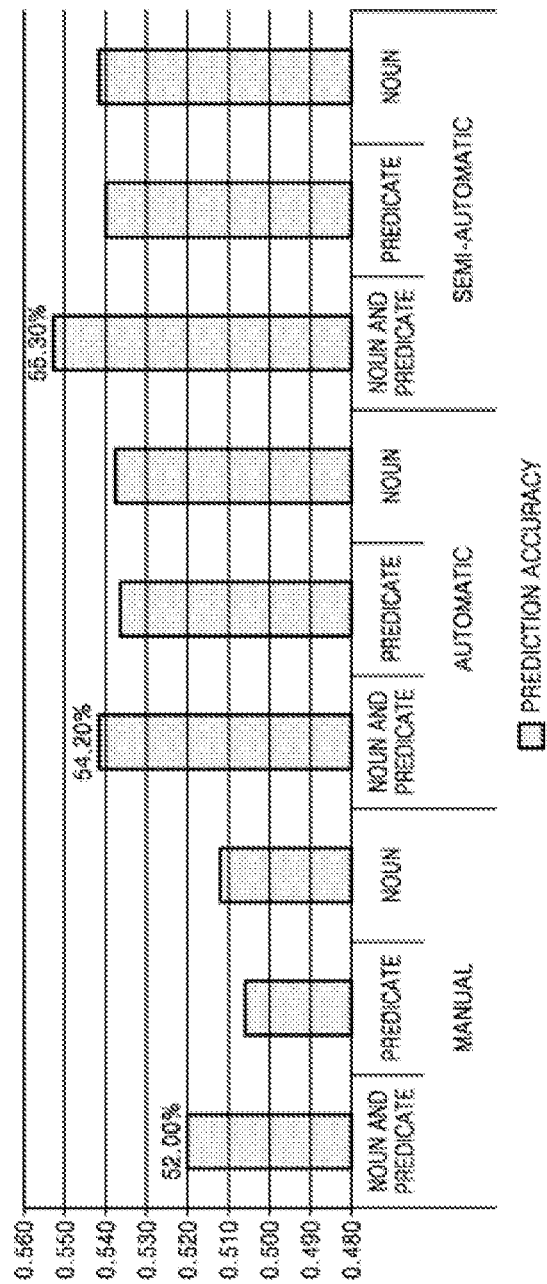
FIG. 6 is a diagram illustrating a result of prediction accuracy using a manual/semi-automatic/automatic sentiment dictionary according to an embodiment of the present invention.

FIG. 6 is a diagram illustrating a result of prediction accuracy using a manual/semi-automatic/automatic sensitivity dictionary according to an embodiment of the present invention.

As a result, the prediction accuracy of the word class specific sentiment dictionary prediction model when the sentiment dictionary is semi-automatically constructed is higher than that when the sentiment dictionary is manually/automatically constructed.

Among the case in which the sentiment dictionary is made by using the noun and the predicate shows the highest prediction accuracy as 54.2 to 55.3%.

Further, the semi-automatic sentiment dictionary using the noun and the predicate, which has the highest prediction accuracy is shown in [Table 10] and [Table 11].

[Table 10] shows that sentiment words in which the sentiment value is higher 20% are arranged in the semi-automatic sentiment dictionary using the noun and the predicate and [Table 10] shows that sentiment words in which the sentiment value is lower 20% are arranged.

TABLE 10

Higher 20% of sentiment value of semi-automatic sentiment dictionary

| Sentiment word | Word attribute | Sentiment value | Frequency | Weighted value |
|---|---|---|---|---|
| Short selling | Noun | 0.542 | 285 | 154.58 |
| Stock price falling | Noun | 0.414 | 120 | 49.68 |
| Interest rate reduction | Noun | 0.372 | 183 | 68.05 |
| Strategic | Noun | 0.361 | 165 | 59.55 |
| Disparate ratio | Noun | 0.295 | 123 | 36.31 |
| Imbalance | Noun | 0.242 | 171 | 41.38 |
| Weak yen | Noun | 0.236 | 221 | 52.07 |
| Warm breeze | Noun | 0.226 | 176 | 39.72 |
| Falling range excess stock | Noun | 0.221 | 115 | 25.36 |

TABLE 10-continued

Higher 20% of sentiment value of semi-automatic sentiment dictionary

| Sentiment word | Word attribute | Sentiment value | Frequency | Weighted value |
|---|---|---|---|---|
| Limited | Predicate | 0.212 | 208 | 44.13 |
| Configured | Predicate | 0.203 | 246 | 49.85 |
| Increase width | Noun | 0.202 | 1,285 | 259.52 |
| Low growth | Noun | 0.175 | 175 | 30.55 |
| Upward adjustment | Noun | 0.173 | 121 | 20.91 |
| Composite leading index | Noun | 0.17 | 554 | 93.91 |
| Obtain | Predicate | 0.165 | 155 | 25.51 |
| Possess | Predicate | 0.16 | 405 | 64.55 |
| Rebound trend | Noun | 0.156 | 258 | 40.32 |
| Net sale trend | Noun | 0.151 | 135 | 20.33 |
| Rising elasticity | Noun | 0.146 | 376 | 54.94 |
| Consumption sentiment | Noun | 0.145 | 275 | 39.96 |
| Price limit width | Noun | 0.141 | 197 | 27.83 |
| Defend well | Predicate | 0.139 | 293 | 40.67 |
| Consumer confidence index | Noun | 0.135 | 209 | 28.16 |
| Buy priority | Noun | 0.12 | 409 | 48.9 |
| Retreat | Predicate | 0.118 | 165 | 19.53 |
| Acknowledge | Noun | 0.117 | 218 | 25.58 |
| Ultra low interest rate | Noun | 0.109 | 137 | 14.91 |

TABLE 11

Lower 20% of sentiment value of semi-automatic sentiment dictionary

| Sentiment word | Word attribute | Sentiment value | Frequency | Weighted value |
|---|---|---|---|---|
| Economic recession | Noun | −0.072 | 508 | −36.6 |
| Fatigue feeling | Noun | −0.077 | 130 | −10.07 |
| Advise | Predicate | −0.082 | 1,509 | −123.49 |
| Approve | Predicate | −0.085 | 181 | −15.42 |
| Rapid falling trend | Noun | −0.089 | 263 | −51.45 |
| Positive trend | Noun | −0.115 | 346 | −23.34 |
| Earning shock | Noun | −0.115 | 346 | −39.66 |
| Alert feeling | Noun | −0.115 | 129 | −14.89 |
| Earning season | Noun | −0.116 | 562 | −64.98 |
| Do not | Predicate | −0.125 | 152 | −19 |
| Depression | Noun | −0.13 | 304 | −39.62 |
| Increase width | Noun | −0.138 | 164 | −22.63 |
| Default | Noun | −0.141 | 110 | −15.5 |
| Peep | Predicate | −0.149 | 197 | −29.38 |
| Degradation | Noun | −0.158 | 947 | −149.69 |
| Hesitate | Predicate | −0.193 | 166 | −32.03 |
| Rapid falling | Noun | −0.2 | 1,281 | −256.31 |
| Inflation rate | Noun | −0.202 | 247 | −49.97 |
| Profit turn | Noun | −0.236 | 228 | −53.74 |
| Won value | Noun | −0.236 | 228 | −53.74 |
| Bull market | Noun | −0.241 | 161 | −38.88 |
| Uneasiness | Noun | −0.252 | 135 | −34 |
| Default | Noun | −0.285 | 815 | −232.12 |
| Low-price buy | Noun | −0.355 | 355 | −126.06 |
| Increment | Noun | −0.394 | 285 | −112.38 |
| Sovereign credit rating | Noun | −0.419 | 269 | −112.75 |
| Panic | Noun | −0.516 | 168 | −86.72 |
| Double deep | Noun | −0.746 | 114 | −85.02 |

However, in respect to words of [Table 10] and [Table 11], there is a case where words of which the sentiment value appropriately has a negative number in a semantic aspect like 'short selling' and 'stock price falling' are selected as higher words.

However, referring to actual new data, a reason for selecting the corresponding words as the higher or lower words may be described as shown in [Table 12].

TABLE 12

Higher/lower description for each word of sentiment dictionary

| Sentiment word | Sentiment value | Description 1 | Description 2 |
|---|---|---|---|
| Short selling | 0.542 | Domestic short selling prevention action | Short selling is limited due to reduction of loan transaction |
| Stock price falling | 0.414 | Stock price falling is an opportunity of buy | Stock price falling is excessive |
| Disparate ratio | 0.295 | Index indicating low evaluation or not | |
| Limited | 0.212 | There is a high possibility to be limited to additional arbitrage selling | Index rising is limited, but overall uncertainty is resolved |
| Low growth | 0.175 | Break away from long term depression and low growth | Meaningful rebound by approving low growth |
| Net sale trend | 0.151 | Net sale trend is shown but selling scale is reduced at the last moment | Net selling trend is shown but |
| Earning season | −0.116 | Expect earning season in next quarter | Fact to enter earning season |
| Increase width | −0.138 | Increase width slows down | |
| Inflation rate | −0.202 | Inflation rate slows down | It is anticipated that inflation rate will decrease |
| Profit turn | −0.236 | It is prospected that profit turn will be available | Expect profit turn in next year |
| Won value | −0.236 | Stock price rapidly falls and won value drops with a thud | Won value rapidly drops |
| Bull market | −0.241 | Need to wait for period after mid of next year until bull market | Dominant stock needs to emerge for bull market |
| Low price | −0.355 | Be troubled for a long period when | Low price buy may be performed |

TABLE 12-continued

Higher/lower description for each word of sentiment dictionary

| Sentiment word | Sentiment value | Description 1 | Description 2 |
|---|---|---|---|
| buy | | rashly entering the low price buy | according to current index and support line itself is meaningless, but IMF, relief loan increment request news |
| Increment | −0.394 | Increment of US debt limit | |

S404, Predictive Power Inspection and Selection of ARIMA Model

In order to inspect the predictive power of the ARIMA model, it is verified whether a stationarity condition of the AR model is determined.

FIG. 7 is a diagram illustrating an execution result of a unit root test of Dickey-Fuller with respect to KOSPI data according to an embodiment of the present invention.

As a result of the verification of FIG. 7, since a null hypothesis in which a p-value is smaller than 0.1 and the mode is instable is rejected, it is inspected that the KOSPI index need not be integrated.

Further, an optimum ARIMA model is automatically generated b using auto.arima among functions used in R in order to select the ARIMA model.

FIG. 8 is a diagram illustrating a selection result of an optimum ARIMA model according to an embodiment of the present invention.

As a result of selecting the optimum ARIMA model, a model in which the AR model has an order of 2 and the MA model has an order of 2 in the ARIMA model is generated as illustrated in FIG. 8.

S405, Prediction Accuracy for Each Prediction Model

Since the prediction accuracy of the semi-automatic sentiment dictionary having the word classes of the noun and the predicate are the highest through the test of S403, in the embodiment of the present invention, the prediction accuracies for a prediction model using the highest prediction accuracy, an ARIMA(2,0,2) prediction model generated through the ARIMA model inspection, and a combined prediction model in which both models are combined are compared with each other.

As a result, the combined prediction model shows the highest prediction accuracy as 58.4%.

Figure 9:
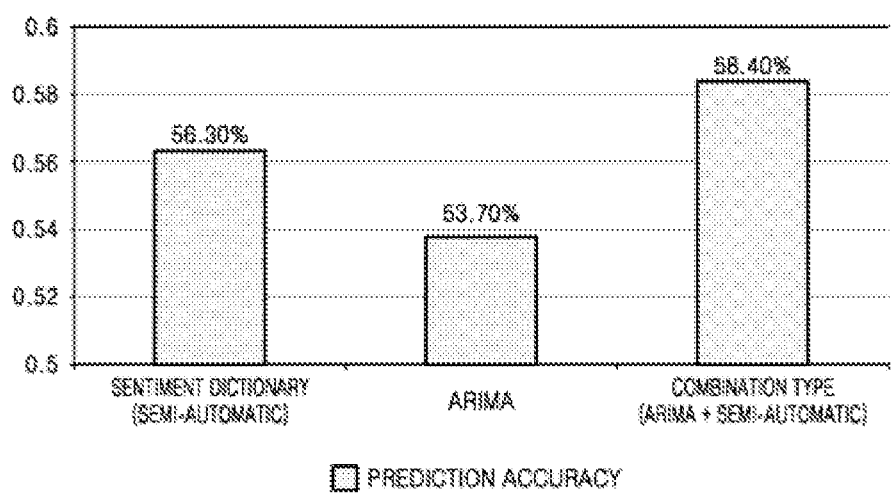
FIG. 9 is a diagram illustrating a result of prediction accuracy for each prediction model according to an embodiment of the present invention.

FIG. 9 is a diagram illustrating a result of prediction accuracy for each prediction model according to an embodiment of the present invention.

[Table 13] shows that the number of prediction cases of rising/falling of a prediction class as compared with an actual class with respect to the combined prediction mode is organized as a table and the number of prediction cases when 'actual rising' is predicted 'rising' is larger than that when 'actual falling' is predicted as 'falling' and the number of prediction cases when 'actual rising' is predicted as 'falling' is larger than that when 'actual falling' is predicted as 'rising'.

TABLE 13

| | Prediction falling | Prediction rising |
|---|---|---|
| Actual falling | 58 | 67 |
| Actual rising | 34 | 86 |

S406, Prediction Accuracy of Strong Rising and Strong Falling

Additionally, a test is performed, which predicts a case of wide rising or a case of wide falling of the KOSPI index by using the prediction model according to the embodiment of the present invention.

'Strong rising' means a case where fluctuation of the closing price of the current day to the closing price of the previous day increases by 0.5% or more and 'strong falling' is set as a case where the fluctuation of the closing price of the current day to the closing price of the previous day increases by −0.5% or less.

As a result, respective cases where actual 'strong rising/falling' is predicted as 'strong rising/falling' occur three times and two times, respectively and when even a case where 'actual strong rising/falling' is predicted as 'rising/falling' is included, the prediction accuracy of approximately 36.8% is shown.

[Table 14] shows the prediction accuracy depending on the strong rising and the strong falling.

TABLE 14

Prediction accuracy depending on strong rising and falling

| | | Prediction class | | | |
|---|---|---|---|---|---|
| | | Strong rising | Rising | Falling | Strong falling |
| Actual class | Strong rising | 3 | 18 | 29 | 0 |
| | Rising | 1 | 36 | 35 | 3 |
| | Falling | 1 | 24 | 49 | 5 |
| | Strong falling | 1 | 8 | 30 | 2 |

For reference, a comparative research for comparing the test results and comparative test and evaluation with the comparative research according to the embodiment of the present invention are performed.

In the comparative research, the fluctuation of the starting price of the current day to the closing price of the previous day is predicted by constructing the sentiment dictionary from news distributed between 15:00 of the previous day and 09:00 of the current day and the fluctuation of the closing price to the starting price of the current day is predicted by constructing the sentiment dictionary from the news distributed between 09:00 of the current day and 15:00 of the current day.

The prediction model according to the embodiment of the present invention is changed to data and a prediction range of the comparative research to perform the comparative test.

As a result, the fluctuation when the stock fluctuation is predicted by the combined prediction model according to the embodiment of the present invention is higher than the comparative research by approximately 7%.

[Table 15] shows that the combined prediction model according to the embodiment of the present invention and the test result ((An Seong Won (2010), Stock Prediction using News Text Mining and Time-series Analysis) of the comparative research are organized.

TABLE 15

Test result of combined prediction model according to the embodiment of the present invention and comparative research

| | Present research (combined prediction model) | Comparative research |
|---|---|---|
| Prediction range | Fluctuation of starting price of current day to closing price of previous day Fluctuation of closing price of current day to starting price of current day | Fluctuation of starting price of current day to closing price of previous day Fluctuation of closing price of current day to staring price of current day |
| News used for prediction | Previous day 15:00~current day 09:00 Current day 09:00~current day 15:00 | Previous day 15:00~current day 09:00 Current day 09:00~current day 15:00 |
| Sentiment word extracting method | Chang Won University morphine analyzer Extracting noun and predicate Fluctuation rate threshold (0.5) Frequency threshold (120) | Chang Won University morphine analyzer Extracting noun Fluctuation rate threshold (0.3) Frequency threshold (3) |
| Prediction model | Logistic Regression (Text mining, ARIMA) | Naïve Bayes, RSI |
| Training Set | Years of 2005 to 2007 | Years of 2005 to 2007 |
| Test Set | Year of 2008 | Year of 2008 |
| Accuracy | 61.5% | 55% |

Hereinafter, a process and a result of testing how assets are changed will be described when investing in a stock market with the prediction model according to the embodiment of the present invention.

To this end, an investment period is set to 1 year (January 2014 to December 2014) and evaluation is performed without considering a charge for dealing.

[Table 16] shows a dealing strategy depending on the prediction result.

| Prediction result | In possessing cash | In possessing stock | Actual result | Assets change |
|---|---|---|---|---|
| Rising | Buying all stocks | Maintaining stock | Rising | (Investment amount * fluctuation rate) profit |
| | | | Falling | (Investment amount * fluctuation rate) loss |
| Falling | Maintaining cash | Selling all stocks | Rising | Not changed |
| | | | Falling | Not changed |

For example, when the prediction result of the previous day is shown as rising, a dealing strategy is adopted, which purchases all stocks when cash is possessed and maintains possessed stocks when the stocks are possessed.

When the prediction result of the previous day is shown as falling, a dealing strategy is adopted, which maintains the cash when the cash is possessed and sells all stocks when the stocks are possessed.

Figure 10:
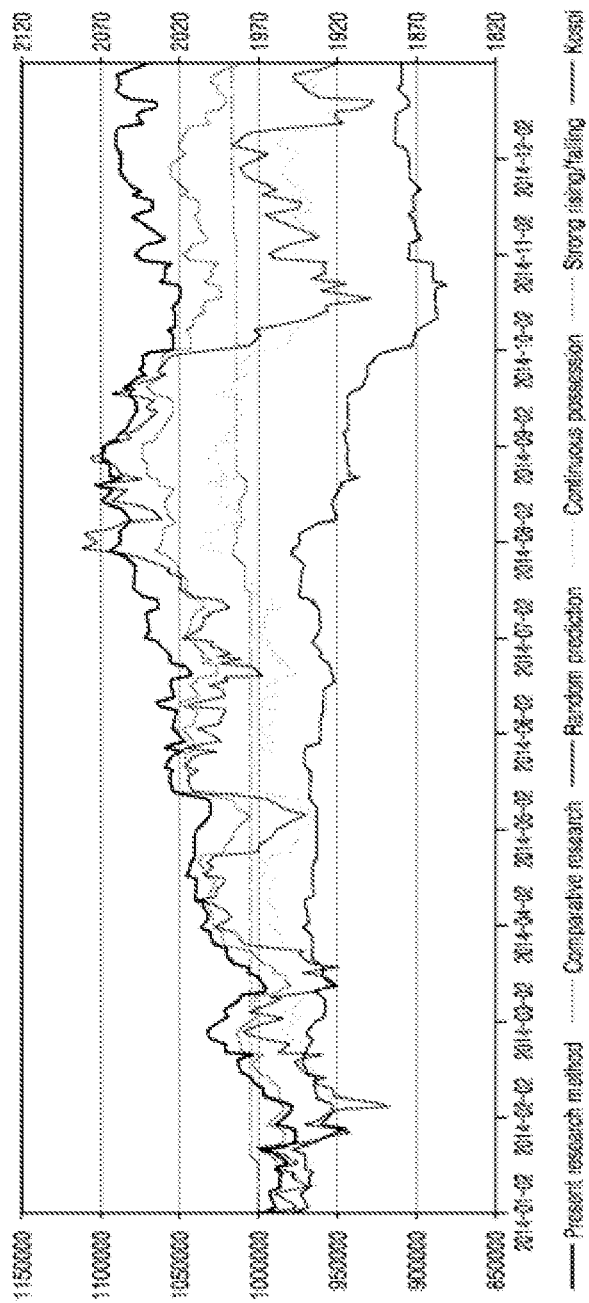
FIG. 10 is a diagram illustrating a result of an asset change for each study method.

FIG. 10 is a diagram illustrating a result of an asset change for each study method.

TABLE 17

Assets change result for each research method

| | Assets change | Assets change rate |
|---|---|---|
| Present research method | 1,071,159 | 7% |
| Comparative research | 1,012,367 | 1.24% |
| Random prediction | 909,054 | −2.65% |
| Continuous possession | 952,278 | −4.77% |
| Strong rising/falling | 1,017,363 | 1.74% |
| KOSPI | — | −4.39% |

In [Table 17], the comparative research adopts a thesis test result (Ping-Feng Pai (2005), "A hybrid ARIMA and support vector machines model in stock price forecasting", Omega 33, pp. 497-505.) and random prediction adopts a result of randomly predicting stock fluctuation of a next day as rising or falling.

Further, continuous possession represents a case where the stocks are not sold but continuously possessed and strong rising/falling represents performing dealing only in a case where the KOSPI index strong rises or falls.

The prediction model according to the embodiment of the present invention shows an assets change rate of approximately 7% as an assets change after 1 year is 71159 won when the principle one million won is invested and the comparative research shows the assets change rate of approximately 1.24% as the assets change after 1 year is 12367 won.

Contrary to this, KOSPI is shown as −4.39%. In this regard, since the prediction model according to the embodiment of the present invention shows the assets change of approximately 7% as compared with the case where the KOSPI is −4.39%, the actual assets change of approximately 10% or more compared with the KOSPI may be evaluated.

As described above, the present invention provides the model in which the prediction model by the news based text mining and the ARIMA model using the KOSPI data are combined in order to predict the fluctuation of the closing price of the next day to the closing price of the current day.

A feature of the prediction model according to the embodiment of the present invention is that the sentiment dictionary of the stock domain which may be digitized as positive/negative by using a word extracted from the economic news is presented and that the combined model obtained by combining the ARIMA model with the news based text mining.

According to the test result for the prediction model according to the embodiment of the present invention, the prediction model obtained by combining the ARIMA model with the news based text mining method shows higher prediction accuracy than the prediction model using only the news based text mining method by approximately 7%.

Further, in selecting the word class, a method that constructs the sentiment dictionary by using both the noun and the predicate shows best performance than the method that constructs the sentiment dictionary by using the noun or the predicate.

In the prediction model according to an embodiment of the present invention, since stock fluctuation is predicted by using the news and past KOSPI data for general investors to easily access, it is practical.

Further, the embodiment can be used even to predict exchange rate closely related with a stock price and an economic index such as raw materials.

The method that automatically constructs the sentiment dictionary of the stock price domain may be applied to other domains such as prediction of product sales using a product review based sensitivity dictionary and prediction of movie promotion using a move review based sensitivity dictionary.

The description of the present invention is just for illustration and those skilled in the art will be able to understand that the present invention can be easily modified to other detailed forms without changing the technical spirit or an essential characteristic of the present invention.

Therefore, it should be appreciated that the embodiments described above are exemplificative in all aspects and not limitative.

For example, the respective components described as a single type may be distributed and implemented and similarly, components described to be distributed may also be implemented as a combined form.

The scope of the present invention is represented by the claims to be described below and it is to be interpreted that the meaning and scope of the claims and all the changes or modified forms derived from the equivalents thereof come within the scope of the present invention.

What is claimed is:

1. A server predicting stock fluctuation, the server comprising:
   a data collector configured to collect text data and securities stock index data;
   a preprocessor configured to extract words through stop-word removal and morphological analysis of the collected text data;
   a sentiment dictionary constructor configured to construct a sentiment dictionary of a stock domain required for stock prediction by selecting a sentiment word from the extracted words and calculating a sentiment value of the selected sentiment word; and
   a stock fluctuation prediction model constructor configured to predict fluctuation of a closing price of a next day to a closing price of a current day by combining a prediction model using the constructed sentiment dictionary and an autoregressive integrated moving average (ARIMA) prediction model using the collected securities stock index data,
   wherein the preprocessor is configured to
      extract first continuous session news which is news distributed for an opening hour from the collected text data, and
      exclude news distributed in a non-opening day, which includes news distributed in the weekend or holiday,
   wherein the sentiment dictionary constructor configured to
      extract second continuous session news in which a fluctuation rate of a stock in a next day after the first continuous session news is distributed is equal to or more than a first predetermined threshold among the first continuous session news,
      extract words having word classes of a noun and an adjective, respectively from the extracted second continuous session news to calculate an occurrence frequency of the extracted words, and
      select, from the extracted words, the sentiment word in which the calculated occurrence frequency is equal to or more than a second predetermined threshold and calculate the sentiment value of the selected sentiment word, and
   wherein the fluctuation rate of the stock is a rate of the closing price of the current day to a closing price of a securities stock index closing price of the previous day.

2. The server of claim 1, wherein the preprocessor extracts the word by processing at least one of removal of a word having one syllable, deletion of a meaningless word including a figure or a year, deletion of an item name and an item code, and deletion of a special character and an advertisement copy.

3. The server of claim 1, wherein:
   the sentiment dictionary constructor is configured to apply a weighted value corresponding to the fluctuation rate of the second continuous session news in which the selected sentiment word emerges to an average of the occurrence frequency of the extracted words to calculate the sentiment value of the selected sentiment word, and
   the sentiment value has a range of '−∞~∞' and as the sentiment value is closer to ∞, the case means strong rising.

4. The server of claim 1, wherein:
   the stock fluctuation prediction model constructor is configured to calculate a sentiment value for specific continuous session news distributed at a specific date and a sentiment value for the specific date to generate the prediction model using the sentiment dictionary,
   the stock fluctuation prediction model constructor is configured to calculate the sentiment value for the specific continuous session news by an average sentiment value of the sentiment words which emerge in the specific continuous session news, the average sentiment value of the sentiment words calculated by an average of sentiment values of words which emerge in both a set of the sentiment words of the constructed sentiment dictionary and a set of the words extracted from the specific continuous session news, and
   the stock fluctuation prediction model constructor is configured to calculate the sentiment value for the specific date by an average of the sentiment values for one or more continuous session news distributed at the specific date.

5. The server of claim 4, wherein:
   the stock fluctuation prediction model constructor is configured to
      inspect prediction power of the ARIMA prediction model by using the securities stock index data, and
      calculate a prediction probability value of the ARIMA prediction model by determining auto regressive (AR), moving average (MA), and integration of the ARIMA prediction model.

6. The server of claim 5, wherein:
   the stock fluctuation prediction model constructor is configured to
      generate a stock fluctuation prediction model by using a result of calculating the sentiment value for one day at a specific date by using the constructed sentiment dictionary and the prediction probability value calculated by using the ARIMA prediction model, and
      predict at least one of rising and falling of the closing price of the next day to the current day by using the generated stock fluctuation prediction model.

7. The server of claim 5, wherein the prediction power of the ARIMA prediction model is inspected by using verifying whether a stationary condition of an AR model is determined.

8. A method for predicting stock fluctuation performed by a server comprising a processor, the method comprising:
   (a) collecting, by the processor, text data and securities stock index data;

(b) extracting, by the processor, words through stopword removal and morphological analysis of the collected text data;

(c) constructing, by the processor, a sentiment dictionary of a stock domain required for stock prediction by selecting a sentiment word from the extracted words and calculating a sentiment value of the selected sentiment word; and (d) predicting, by the processor, fluctuation of a closing price of a next day to a closing price of a current day by combining a prediction model using the constructed sentiment dictionary and an autoregressive integrated moving average (ARIMA) prediction model using the collected securities stock index data, wherein, in step (b), the processor extracts first continuous session news which is news distributed for an opening hour from the collected text data and excludes news distributed in a non-opening day which includes news distributed in the weekend or holiday, and wherein, in step (c), the processor extracts second continuous session news in which a fluctuation rate of a stock in a next day after the first continuous session news is distributed is equal to or more than a first predetermined threshold among the first continuous session news, extracts words having word classes of a noun and an adjective, respectively, from the extracted second continuous session news to calculate an occurrence frequency of the extracted words, selects, from the extracted words, the sentiment word in which the calculated occurrence frequency is equal to or more than a second predetermined threshold, and calculates the sentiment value of the selected sentiment word, wherein the fluctuation rate of the stock is a rate of the closing price of the current day to a closing price of a securities stock index closing price of the previous day.

9. The method of claim 8, wherein in step (c), the processor applies a weighted value corresponding to the second fluctuation rate of the second continuous session news in which the selected sentiment word emerges to an average of the occurrence frequency of the extracted words to calculate the sentiment value of the selected sentiment word, and wherein the sentiment value has a range of '$-\infty \sim \infty$' and as the sentiment value is closer to $\infty$, the case means strong rising.

10. The method of claim 8, wherein: in step (d), the processor calculates a sentiment value for specific continuous session news distributed at a specific date and a sentiment value for the specific date to generate the prediction model using the sentiment dictionary, calculates the sentiment value for the specific continuous session news by an average sentiment value of the sentiment words which emerge in the specific continuous session news, the average sentiment value of the sentiment words calculated by an average of sentiment values of words which emerge in both a set of the sentiment words of the constructed sentiment dictionary and a set of the words extracted from the specific continuous session news, and calculates the sentiment value for the specific date by an average of the sentiment values for one or more continuous session news distributed at the specific date.

11. The method of claim 8, wherein in step (d), the processor inspects prediction power of the ARIMA prediction model by using the securities stock index data and calculates a prediction probability value of the ARIMA prediction model by determining auto regressive (AR), moving average (MA), and integration of the ARIMA prediction model.

\* \* \* \* \*